W. C. KNEALE.
MOLDING MACHINE.
APPLICATION FILED DEC. 4, 1907.

905,328.

Patented Dec. 1, 1908.

2 SHEETS—SHEET 1.

WITNESSES:

INVENTOR
William C. Kneale
BY
Thompson & Bell
ATTORNEY

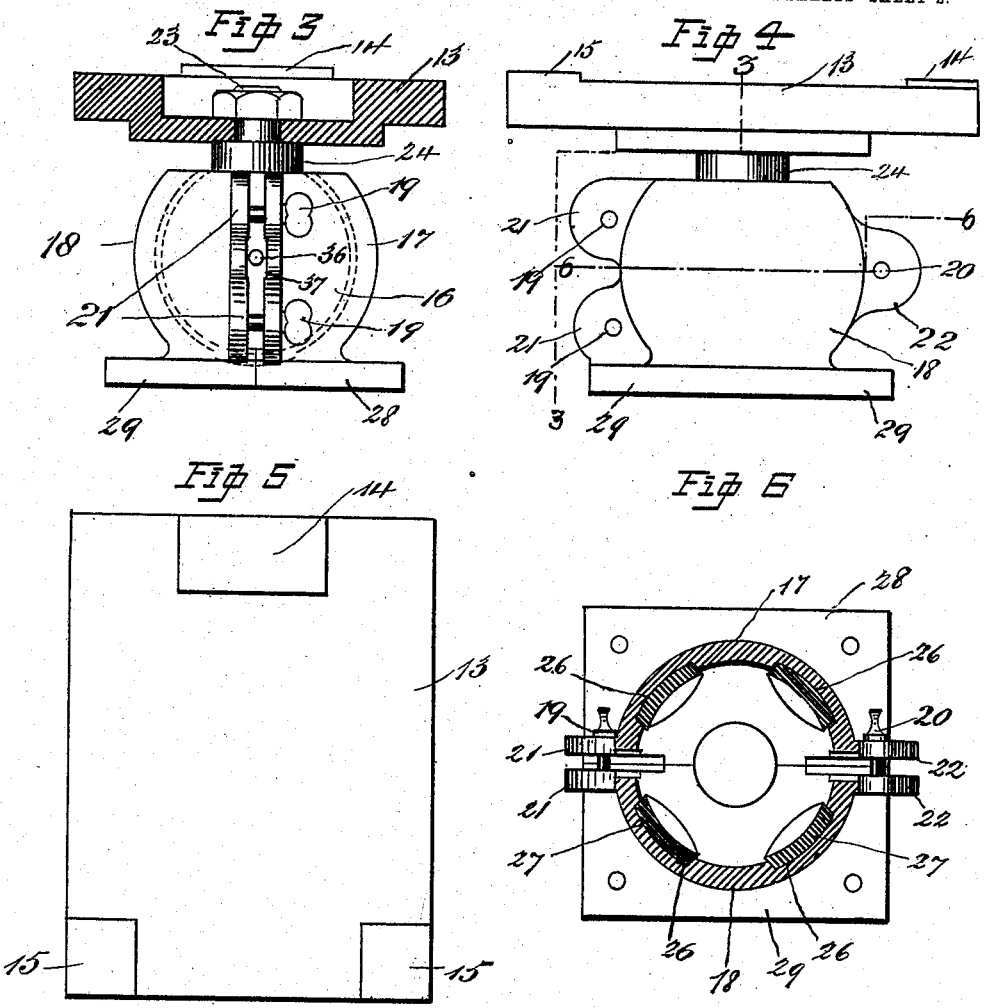

UNITED STATES PATENT OFFICE.

WILLIAM C. KNEALE, OF INDIANAPOLIS, INDIANA.

MOLDING-MACHINE.

No. 905,328.  Specification of Letters Patent.  Patented Dec. 1, 1908.

Application filed December 4, 1907. Serial No. 405,077.

*To all whom it may concern:*

Be it known that I, WILLIAM C. KNEALE, a citizen of the United States, residing at Indianapolis, in the county of Marion and State of Indiana, have invented certain new and useful Improvements in Molding-Machines, of which the following is a specification, reference being had therein to the accompanying drawing.

This invention relates to a device whereby the mold receiving tables of rock over molding machines or molding machines of this type are rendered automatically adjustable, as hereinafter described in the specification and particularly pointed out in the claims.

In rock-over molding machines, and all machines of that type heretofore in use for flask molding, it has been found in practice that the surfaces of the molding boards used in connection with the molding flasks thereof, warp and twist after a little use, which is due to the moisture in the sand mold with which they contact, so that, when the molds with their molding boards are turned over upon the mold receiving table, said molding boards are not firmly seated thereupon, but, owing to the warped surfaces of said boards, are unstable and easily tilted or rocked, and the pattern, when being withdrawn from the mold, will break said mold necessitating the dressing of the same, and in some cases, will destroy the mold beyond repair.

The object of this invention is to provide a means for automatically adjusting the mold receiving tables of molding machines of the type illustrated to the uneven warped surfaces of the molding boards upon which the sand molds rest and whereby said molding boards are supported to maintain the molds in their relative position to the draft of the mold, so that the sand of the latter will not be broken when withdrawing the patterns therefrom. I attain this object by means of the device illustrated in the accompanying drawings in which like numerals of reference designate like parts throughout the several views.

Figure 1:
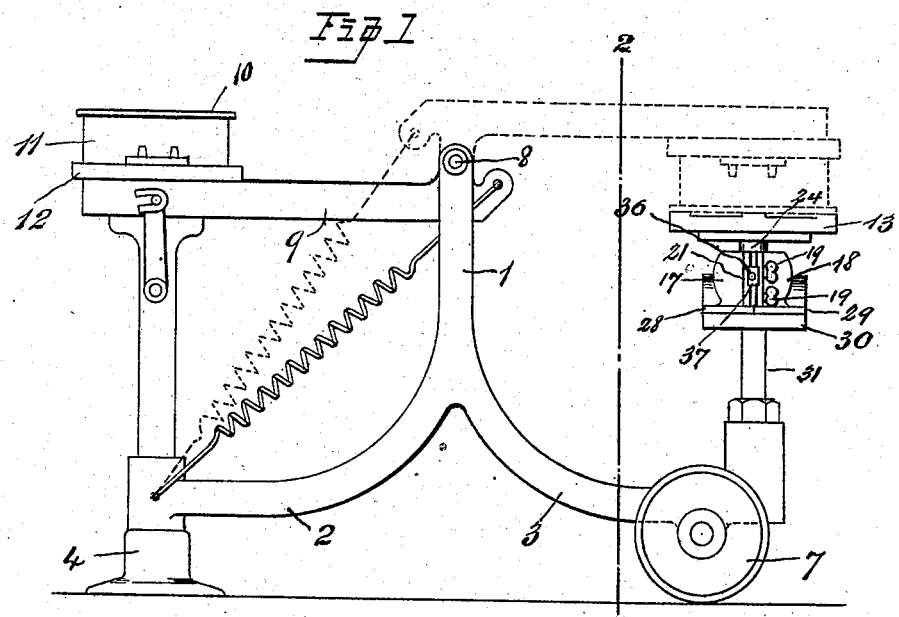
Figure 2:
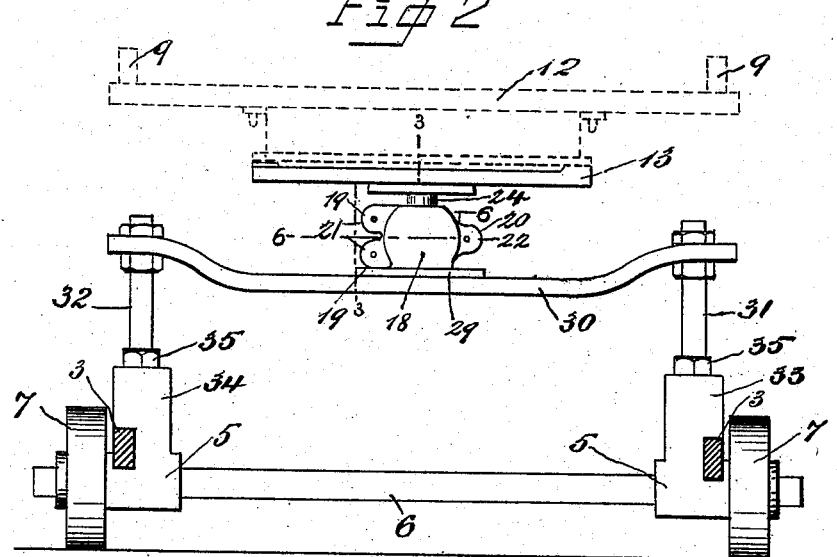

Figure 1 is a side elevational view of a rock-over molding machine showing my invention of a table equalizing device applied thereto; Fig. 2 is a sectional end elevational view of the same taken along the line 2—2 in Fig. 1; Fig. 3 is a detail enlarged sectional elevational view of said equalizing device taken along the lines 3—3 in Figs. 2 and 4; Fig. 4 is a detail front elevational view of said equalizing device; Fig. 5 is a top view of the mold receiving table showing the bearing spottings thereof, and Fig. 6 is an enlarged detail sectional view of the same taken along the line 6—6 in Figs. 3 and 4.

The type of molding machine to which my invention is particularly adapted is known as a rock-over molding machine, and comprises the supporting standards 1 provided with the forward legs 2 and the rear legs 3. The ends of the forward legs 2 are supported upon the supporting feet 4, and the legs 3 are provided with the bearings 5 in which is journaled the supporting axle 6, and on the projecting ends of the latter are mounted the truck wheels 7 whereon the machine is supported and moved when required.

At or near the top ends of the standards 1 is journaled the shaft 8 upon which the arms 9 are mounted to swing, so as to transfer the mold from the position shown in full lines to that shown in dotted lines in Fig. 1.

The molding board 10 is situated on the open top end of the flask 11 to inclose the sand mold and said flask is secured to the pattern table 12 which latter is permanently secured to the arms 9 to swing therewith.

The receiving table 13 by and upon which the molding board 10 is received, is provided with the three bearing spottings 14 and 15, situated as shown in Fig. 5, so that any molding board, no matter how warped or uneven its surface may be, will find or accommodate its surface to a bearing upon said three spottings of said table, and be stable thereupon.

The position of the receiving table 13 relative to the line of the swing of the arms 9 is automatically adjusted and maintained by means of the automatic adjusting device which is the essence of this invention and which I shall now proceed to describe.

This invention of an equalizing device is composed essentially of the ball or sphere 16 and the outer casing or socket, composed of the opposing halves 17 and 18, which are adjustably sprung together by the clamping thumb screws 19 and 20 of the clamping lugs 21 and 22. A stud 23 projects from the top flat portion of the ball bearing 16 and a bearing collar 24 is formed integral on said stud which is of a thickness sufficient to provide the proper clearance space between the bottom of the table 13 and the top flat portion of the ball bearing 16.

The concave surfaces of the opposing halves of the socket are provided with the recesses 26 into each of which a yielding friction producing material 27, as leather, is fitted to project slightly beyond the concave inner surfaces of said halves to present yielding friction surfaces to and against the spherical surface of the ball bearing 16.

The bases 28 and 29 are formed integral with the opposing halves 17 and 18 of the socket and said bases are securely bolted to the supporting plate 30 which latter is adjustably secured at its ends to the top ends of the vertically extending adjusting studs 31 and 32. The adjusting studs 31 and 32 fit loosely in the bosses 33 and 34 formed integral on the ends of the legs 3, and said studs are adjusted vertically by the screw nuts 35.

The steadying pins 36 project from the diametrically opposite sides of the ball bearing 16 to extend into the recesses 37 formed in the opposing halves 17 and 18, and the same is provided for the purpose of preventing said ball bearing rotating in a horizontal direction in its casing.

I will now proceed to describe the operation of the device. Suppose the pattern secured to the pattern table 12 and the flask 11 placed in position on said table to inclose said pattern. The molding sand is now applied and rammed into the flask in the usual manner. The molding board 10 is now placed over and upon the open top end of the flask 11 to retain the mold therein when inverting the latter.

The sand mold having been formed and the molding board 10 having been applied to the top open end of the flask 11 and secured thereto to retain the mold therein when turning said flask over upon its reverse or open end, is now swung over till the molding board 10 rests upon the receiving table 13. The molding table and the flask 11 which is clamped thereto are now swung back into the position shown in full lines in Fig. 1, leaving the molding board 10 with the mold resting thereon, upon the receiving table 13 which latter by means of the adjusting means described will automatically adjust its bearing spottings to the irregular or warped surface of the molding board and maintain the mold in its stable position relative to the pattern and the pattern table 12.

I claim:—

1. In a rockover molding machine, the combination with a receiving table, bearing spottings on the top surface of said table, and a supporting plate, of a ball bearing situated centrally under and secured to said receiving table, a ball inclosing casing secured to said supporting plate and divided into opposing halves, friction bearing pads composed of a yielding material projecting from the interior concave surface of said casing and a casing clamping means.

2. In a rockover molding machine, the combination with a receiving table and a supporting plate, of a ball bearing situated under and secured to said table, a casing into which said ball bearing is fitted resting upon and secured to said supporting plate, and means for preventing a horizontal rotation of said ball bearing in said casing.

3. In a rock over molding machine, the combination with a receiving table and a supporting plate, of a ball bearing situated under and secured to said table, a casing into which said ball bearing is fitted resting upon and secured to said supporting plate, said casing divided into opposing halves, and stop pins projecting from the opposing sides of said ball bearing to extend between said opposing halves of said casing.

In testimony whereof I have affixed my signature in presence of two witnesses.

WILLIAM C. KNEALE.

Witnesses:
THOMPSON R. BELL,
HUGH J. BAKER.